United States Patent
Weber et al.

(10) Patent No.: US 6,172,148 B1
(45) Date of Patent: Jan. 9, 2001

(54) NONFLAMMABLE MOULDABLE MATERIAL BASED ON POLYPHENYLENE ESTERS AND VINYL AROMATIC POLYMERS

(75) Inventors: Martin Weber, Maikammer; Peter Horn, Heidelberg; Walter Heckmann, Weinheim; Ulrich Müller; Axel Gottschalk, both of Neustadt, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/284,542

(22) PCT Filed: Sep. 23, 1997

(86) PCT No.: PCT/EP97/05203

§ 371 Date: Apr. 14, 1999

§ 102(e) Date: Apr. 14, 1999

(87) PCT Pub. No.: WO98/16584

PCT Pub. Date: Apr. 23, 1998

(30) Foreign Application Priority Data

Oct. 15, 1996 (DE) .............................. 196 42 491

(51) Int. Cl.$^7$ .................................................. C08K 5/34
(52) U.S. Cl. .................. 524/100; 524/101; 524/446; 524/447
(58) Field of Search .................... 524/446, 447, 524/101, 100; 501/146, 148

(56) References Cited

U.S. PATENT DOCUMENTS

| | | |
|---|---|---|
| 2,694,692 | 11/1954 | Amos et al. . |
| 2,862,906 | 12/1958 | Stein et al. . |
| 3,280,084 | 10/1966 | Zelinski et al. . |
| 3,383,435 | 5/1968 | Cizek . |
| 3,516,959 * | 6/1970 | Jonas ..................................... 524/447 |
| 3,637,554 | 1/1972 | Childers et al. . |
| 3,639,508 | 2/1972 | Kambour . |
| 3,660,531 | 5/1972 | Lauchlan et al. . |
| 3,908,001 | 9/1975 | Symons et al. . |
| 3,985,830 | 10/1976 | Fetters et al. . |
| 4,091,053 | 5/1978 | Kitchen . |
| 4,107,232 | 8/1978 | Haaf et al. . |
| 4,128,602 | 12/1978 | Katchman et al. . |
| 4,128,603 | 12/1978 | Katchman et al. . |
| 4,360,618 | 11/1982 | Trementozzi . |
| 4,405,735 | 9/1983 | Wiezer et al. . |
| 4,467,057 * | 8/1984 | Dieck et al. .......................... 524/447 |
| 4,546,126 * | 10/1985 | Breitenfellner et al. ............. 524/445 |
| 4,563,500 | 1/1986 | Haaf et al. . |
| 4,582,866 * | 4/1986 | Shain ................................... 524/447 |
| 4,826,899 * | 5/1989 | Rees ..................................... 524/437 |
| 5,008,314 | 4/1991 | Lee, Jr. . |
| 5,139,555 * | 8/1992 | Freepons ................................. 71/29 |
| 5,164,440 * | 11/1992 | Deguchi et al. ...................... 524/445 |
| 5,716,569 * | 2/1998 | Berenbold et al. ................... 264/115 |
| 5,773,502 * | 6/1998 | Takekoshi et al. ................... 524/447 |

FOREIGN PATENT DOCUMENTS

| | | |
|---|---|---|
| 24 97 531 | 10/1975 | (DE) . |
| 080 666 | 6/1983 | (EP) . |
| 132 228 | 1/1985 | (EP) . |
| 305 764 | 3/1989 | (EP) . |
| 352 042 | 1/1990 | (EP) . |
| 476 366 | 3/1992 | (EP) . |
| 550 204 | 7/1993 | (EP) . |
| 550 204A | 7/1993 | (EP) . |
| 2 060 656 | 7/1981 | (GB) . |
| 2 290 547 | 1/1996 | (GB) . |
| 2 294 934 | 5/1996 | (GB) . |
| 1-139642 * | 6/1989 | (JP) ..................................... 524/101 |
| 83/01254 | 4/1983 | (WO) . |
| 87/00540 | 1/1987 | (WO) . |

OTHER PUBLICATIONS

Angew Chem Int. Ed. Engl. 20,344–361 (1981) ECHTE et al.
Pharm. Gen. Survey and Develop. vol. A 19 273–291, Hasskarl et al.
Poly. Eng. and Sci, Mid Aug., 1982, vol. 22, No. 11, Fried et al.
Ulmanns Enc. Chem. Bd. 19, 265–271,1980.
J. Troitzsch, Int. Plastics Flam. Handbook 346 ff/.
L. Bottenbruch, Tech. Poly.–Blends, Kunststoffhandbuch 3/2, 63 ff.
Illers et al., Kolloid Zeitschrift 190 (1), 16–34, 1963.
Lagaly, Prog. Colloid & Polym. Sci 95, 61–72, 1994.
Olabisi, Poly.–Polym. Misc., 1979, 224–230, Acd. Press Dto. S. 245.

* cited by examiner

*Primary Examiner*—Veronica P. Hoke
(74) *Attorney, Agent, or Firm*—Keil & Weinkauf

(57) ABSTRACT

Flame-retardant thermoplastic molding materials contain

A) from 5 to 97.7% by weight of a polyphenylene ether,

B) from 1 to 93.7% by weight of vinylaromatic polymers,

C) from 0 to 50% by weight of impact modifiers,

D) from 0.3 to 20% by weight of sheet silicates which contain one or more nitrogen-containing compounds in amounts of from 0.1 to 50% by weight, based on the sheet silicates, E) from 1 to 20% by weight of a flameproofing agent and F) from 0 to 60% by weight of further additives.

12 Claims, No Drawings

NONFLAMMABLE MOULDABLE MATERIAL BASED ON POLYPHENYLENE ESTERS AND VINYL AROMATIC POLYMERS

The present invention relates to flame-retardant thermoplastic molding materials containing
- A) from 5 to 97.7% by weight of a polyphenylene ether,
- B) from 1 to 93.7% by weight of vinylaromatic polymers,
- C) from 0 to 50% by weight of impact modifiers,
- D) from 0.3 to 20% by weight of sheet silicates which contain one or more nitrogen-containing compounds in amounts of from 0.1 to 50% by weight, based on the sheet silicates,
- E) from 1 to 20% by weight of a flameproofing agent and
- F) from 0 to 60% by weight of further additives.

The present invention furthermore relates to the use of flame-retardant thermoplastic molding materials for the production of fibers, films and moldings and to the fibers, films and moldings obtainable therefrom.

Thermoplastic polymer blends comprising polyphenylene ether (PPE) and vinylaromatic polymers, such as styrene polymers, are disclosed, for example, in U.S. Pat. Nos. 3,383,435; 4,128,602 and 4,128,603. Such molding materials are suitable for the production of shaped articles which, in comparison with high impact polystyrene (HIPS) which are not blended with polyphenylene ethers, are distinguished by better heat distortion resistance. A detailed description of the properties of these polymer blends also appears in L. Bottenbruch, "Technische Polymer-Blends", Kunststoff Handbuch 3/2, page 63 et seq., Hanser Verlag, Munich, 1993.

An important advantage of the polymer blends comprising polyphenylene ethers and styrene polymers is that, by admixing halogen-free additives, in particular phosphorus-containing compounds, it is possible to obtain molding materials which are flame-retardant and can therefore be used for many applications in the electrical industry. In particular, the test for flame retardancy according to UL 94 (for example, described in J. Troitzsch, "International Plastics Flammability Handbook", page 346 et seq., Hanser Verlag, Munich, 1990) is critical for use in the electrical industry. In this test, a flame is applied repeatedly to vertically fastened test specimens. The test specimen heats up to a very great extent, leading in many cases to the dripping of flaming polymer material and ignition of the cotton wool mounted below the rod. This undesirable behavior is observed in particular when large amounts of flameproofing agents must be used in order to achieve short combustion times.

The problem of the dripping of flaming particles in UL 94 test has long been known and is solved in industry in general by adding small amounts of Teflon as an antidrip agent (U.S. Pat. No. 4,107,232). However, owing to the evident toxicity of harmful substances liberated in the combustion of halogen-containing substances, attempts have very recently been made completely to avoid the use of such compounds in thermoplastic molding materials.

It is known that the dripping of flaming particles by molding material can be limited or completely suppressed by adding high molecular weight or ultra high molecular weight polymers to thermoplastic molding materials comprising polyphenylene ethers and polystyrene.

European Application EP-A 550 204 described ultra high molecular weight polyethylene as a halogen-free antidrip agent. According to this publication, the addition of ultra high molecular weight polyethylene completely prevents dripping by thermoplastic molding materials comprising polyphenylene ethers and styrene polymers. However, owing to the incompatibility of polyethylene with polyphenylene ether or polystyrene, even small amounts of polyethylene lead to a deterioration of the mechanical properties of the molding materials, in particular the damaging energy $W_s$ declining dramatically.

High molecular weight polystyrenes, too, lead to an improvement in the dripping behavior (European Patent 305,764). U.S. Pat. No. 5,008,314 however discloses that high molecular weight polystyrene substantially improves the stress cracking resistance of the polymer blends comprising polyphenylene ether and high impact polystyrene. High molecular weight polystyrene is also used for the preparation of polyphenylene oxide/polystyrene molding materials which are suitable for processing by blow molding (EP-A 476 366). However, the high molecular weight polystyrene generally prepared by free radical polymerization increases the amount of viscosity in a disadvantageous manner at the shear rates relevant for injection molding. Moreover, the toughness of the molding material decreases with increasing proportion of high molecular weight polystyrene. Additionally disadvantageous is the fact that long combustion times are to be expected in the UL 94 test, both with the use of high molecular weight polystyrene and with the use of high molecular weight polyethylene as antidrip agents.

It is an object of the present invention to provide flame-retardant thermoplastic molding materials, in particular molding materials based on polyphenylene ethers and vinylaromatic polymers, which contain an antidrip agent which does not adversely affect the mechanical and Theological properties and the combustion times according to UL 94.

We have found that this object is achieved by the thermoplastic molding materials defined at the outset.

We have also found the use thereof for the production of fibers, films and moldings, and the fibers, films and moldings obtainable hereby.

The flame-retardant thermoplastic molding materials preferably contain
- A) from 15 to 87% by weight of a polyphenylene ether,
- B) from 10 to 82% by weight of vinylaromatic polymers,
- C) from 0.5 to 30% by weight of impact modifiers,
- D) from 0.5 to 10% by weight of sheet silicates which contain one or more nitrogen-containing compounds in amounts of from 0.1 to 50% by weight, based on the sheet silicates,
- E) from 2 to 15% by weight of a flameproofing agent and
- F) from 0 to 50% by weight of further additives.

The sum of the % by weight of the individual components is 100.

According to the invention, at least one polyphenylene ether known per se is used as component A) In particular, these compounds based on substituted, in particular disubstituted polyphenylene ethers, the ether oxygen of one unit being bonded to the benzene nucleus of the neighboring unit. Polyphenylene ethers substituted in the 2- and/or 6-position relative to the oxygen atom are preferably used. Examples of substituents are halogen, such as chlorine or bromine, and alkyl of 1 to 4 carbon atoms which preferably has no α tertiary hydrogen atom, eg. methyl, ethyl, propyl or butyl. The alkyl radicals may in turn be substituted by halogen such as chlorine or bromine, or by hydroxyl. Further examples of possible substituents are alkoxy, preferably of up to 4 carbon atoms, such as methoxy, ethoxy, n-propoxy and n-butoxy, or phenyl which is unsubstituted or substituted by halogen and/or by alkyl. Copolymers of different phenols, for example copolymers of 2,6-dimethylphenol and 2,3,6-trimethylphenol, are also suitable. It is of course also possible to use mixtures of different polyphenylene ethers. The polyphenylene ethers A) are present in the novel molding materials in an amount of from 5.0 to 97.7, preferably from 15.0 to 87, % by weight.

Examples of polyphenylene ethers are
poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly-(2,6-dichloro-1,4-phenylene ether),
poly(2-methyl-6-phenyl-1,4-phenylene ether),
poly(2,6-dibenzyl-1,4-phenylene ether),
poly(2-ethoxy-1,4-phenylene ether), poly(2-chloro-1,4-phenylene ether) and poly(2,5-dibrom-1,4-phenylene ether). Preferably used polyphenylene ethers are those which are substituted by alkyl of 1 to 4 carbon atoms; poly(2,6-dialkyl-1,4-phenylene ether) such as poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether) and
poly(2-ethyl-6-propyl-1,4-phenylene ether), has proven particularly suitable. Poly(2,6-dimethyl-1,4-phenylene ether) is particularly preferably used.

For the purposes of the present invention, polyphenylene ethers are also to be understood as meaning those which are modified with monomers, such as fumaric acid, maleic acid or maleic anhydride. Such polyphenylene ethers are described, inter alia, in WO 87/00540.

With regard to their physical properties, the polyphenylene ethers which may be preferably used are those which have a weight average molecular weight $M_w$ of from 8000 to 70,000, preferably from 12,000 to 60,000, in particular from 25,000 to 50,000. This corresponds to a limiting viscosity of from about 0.18 to 0.7, preferably from 0.25 to 0.62, in particular from 0.39 to 0.55, dl/g, measured in chloroform at 250° C.

The molecular weight distribution is determined in general by means of gel permeation chromatography (Shodex separation column 0.8×50 cm of type A 803, A 804 and A 805, using tetrahydrofuran (THF) as eluent at room temperature). The PPE samples are dissolved in THF under superatmospheric pressure at 110° C., 0.16 ml of 0.25% strength by weight solution being injected. Detection is effected in general by means of a UV detector. The calibration of the columns was carried out using PPE samples whose absolute molecular weight distributions were determined by a GPC/laser light scattering combination.

Vinylaromatic polymers are used as component B). These are preferably toughened vinylaromatic polymers which are compatible with the component A). The component B) is present in the novel molding materials in amounts of from 1 to 93.7, preferably from 10 to 82, % by weight.

Examples of preferred vinylaromatic polymers compatible with polyphenylene ethers are described in the monograph by O. Olabisi, Polymer-Polymer Miscibility, Academic Press, 1979, pages 224 to 230 and 245.

Suitable homopolymers in addition to polystyrene are also the polymers of styrene homologous, such as p-methylstyrene, α-methylstyrene or divinylbenzene in syndiotactic, isotactic or atactic form, either alone or in the form of any desired mixture.

Homopolymers are generally prepared by the known mass, solution or suspension methods (cf. Ullmanns Enzyklopädie der techn. Chemie, Volume 19, Pages 265 to 272, Verlag Chemie, Weinheim, 1980; H. Gausepohl, R. Gellert, "Polystyrol", Kunststoffhandbuch 4, pages 37–144, Hanser Verlag, Munich, 1996). The homopolymers may have a weight average molecular weight $M_w$ of from 3000 to 300,000, which can be determined by conventional methods. Suitable general purpose polystyrene is prepared by the anionic or free radical polymerization method.

Examples of suitable comonomers for the preparation of copolymers are methacrylic acid, acryl methacrylates where the alkyl radical has from 1 to 4 carbon atoms, cyclohexyl methacrylate, isobornyl methacrylate, acrylonitrile, methacrylonitrile and maleic anhydride as well as maleimides, acrylamide and methacrylamides and their N,N- or N-alkylsubstituted derivatives having 1 to 10 carbon atoms in the alkyl radical. Examples of $C_{1-10}$-alkyl radicals include $C_{1-4}$-alkyl radicals of the above definition and n-pentyl, n-hexyl, n-heptyl, n-octyl, n-nonyl, n-decyl and the branched analogs thereof.

Depending on the chemical structure, the comonomers are present in different amounts in the styrene polymers. The miscibility of the copolymer with the polyphenylene ether A) is critical with regard to the content of comonomers in the copolymer. Such miscibility limits are known and are described, for example, in U.S. Pat. Nos. 4,360,618 and 4,405,753 and in the publication by J. R. Fried and G. A. Hanna, Polymer Eng. Sci., 22 (1982), 705 et seq.

Examples of suitable copolymers are styrene/acrylonitrile copolymers, α-methylstyrene/acrylonitrile copolymers, styrene/maleic anhydride copolymers, styrene/phenylmaleimide copolymers, styrene/methyl methacrylate copolymers, styrene/methyl methacrylate/acrylonitrile copolymers, styrene/acrylonitrile/maleic anhydride copolymers, styrene/acrylonitrile/phenylmaleimide copolymers, α-methylstyrene/acrylonitrile/methyl methacrylate copolymers, α-methylstyrene/acrylonitrile/tert-butyl methacrylate copolymers and styrene/acrylonitrile/tert-butyl methacrylate copolymers.

The copolymers are prepared by known processes which are described, for example, in Ullmanns Enzyklopädie der techn. Chemie, Volume 19, Verlag Chemie, Weinheim (1980), page 273 et seq. The copolymers generally have a weight average molecular weight ($M_w$) of from 10,000 to 300,000, which can be determined by conventional methods.

Suitable high impact polystyrenes are homo- and copolymers of vinylaromatic monomers of 8 to 12 carbon atoms, which are prepared in the presence of a rubber. The rubber content is from 5 to 25, preferably from 8 to 17, % by weight. A description of the structure, properties and preparation of high impact polystyrenes appears in the review literature (A. Echte, F. Haaf and J. Hambrecht in Angew. Chem. (Int. Ed. Engl.) 20, (1981), 344–361, and in Kunststoffhandbuch, Polystyrol volume, Carl Hanser Verlag (1968)).

Suitable high impact polystyrenes are for the most part commercially available and have a viscosity number (VN) of the Hart matrix of from 50 to 130, preferably from 60 to 90, particularly preferably from 80, ml/g (0.5% strength in toluene at 23° C.).

General purpose polystyrene and high impact polystyrene whose toluene-soluble fraction has an average molecular weight $M_w$ of from 50,000 to 500,000 g/mol and which also may have been treated with additives, for example mineral oil, stabilizer, antistatic agents, flameproofing agents or waxes, are preferred.

Suitable monovinylaromatic compounds for high impact polystyrenes are in particular styrene and the styrenes substituted on the nucleus or side chain. Preferred substituents are halogen, in particular chlorine and bromine, hydroxyl and $C_{1-4}$-alkyl, such as methyl, ethyl, n-propyl, isopropyl, n-butyl and tert-butyl. Examples of these compounds are chlorostyrene, α-methylstyrene, styrene, p-methylstyrene, vinyltoluene and p-tert-butylstyrene. However, styrene alone is preferably used.

Furthermore, the high impact polystyrenes used may be structurally modified by the use of special polybutadiene rubbers, for example having a 1,4-cis or 1,4-trans fraction or 1,2- and 1,4-linkage fraction modified compared with conventional rubbers. Preferred high impact polystyrenes are those having a polybutadiene content of 9–11% by weight. High impact polystyrene having cellular particle morphology is particularly preferred. The mean particle size of the soft component should be 1.9–3.5 μm. Furthermore, other diene rubbers and elastomers of the ethylene/propylene/diene copolymer (EPDM rubber) type and hydrogenated diene rubbers may also be used instead of polybutadiene rubber.

The most frequently used processes for the preparation of high impact polystyrenes are mass and solution polymerization in the presence of a rubber, as described, for example, in U.S. Pat. No. 2,694,692, and mass suspension polymerization processes, as described, for example, in U.S. Pat. No. 2,862,906. It is of course also possible to use other processes, provided that the desired particle size of the rubber phase is established.

Impact modifiers (component C) used are rubber impact modifiers in amounts of from 0 to 50, preferably from 0.5 to 30, % by weight, based on the total weight of the molding material.

Natural or synthetic rubbers differing from the component B) may be used as component C). In addition to natural rubber, impact modifiers are, for example, polybutadiene, polyisoprene or copolymers of butadiene and/or isoprene with styrene and other comonomers, which have a glass transition temperature of from −100° C. to +250° C., preferably below 0° C., determined according to K. H. Illers and H. Breuer, Kolloidzeitschrift 190 (1), (1963), 16–34. Appropriately hydrogenated products may also be used.

Preferred impact modifiers C) are block copolymers of vinylaromatics and dienes. Impact modifiers of this type are known. German Published Applications DAS 1,932,234 and DAS 2,000,118 and German Laid-Open Application DOS 2,255,930 describe elastomeric block copolymers and different compositions comprising vinylaromatic and diene blocks. The use of appropriately hydrogenated block copolymers, if required as a mixture with the unhydrogenated precursor, as impact modifiers is described, for example, in German Laid-Open Applications DOS 2,750,515, DOS 2,434,848 and DOS 3,038,551, EP-A-0 080 666 and WO 83/01254. The disclosure of the above publications is hereby incorporated by reference.

Particularly suitable are vinylaromatic/diene block copolymers comprising blocks which contain a hard phase (block type S) and, as a soft phase, a block L/S of diene and vinylaromatic units, which has a random composition. The composition may on statistical average be homogeneous or inhomogeneous along the chain.

Such an elastomeric block copolymer is obtained by forming the soft phase from a random copolymer of a vinylaromatic with a diene; random copolymers of vinyloaromatic and dienes are obtained by polymerization in the presence of a polar cosolvent.

A suitable block copolymer can be represented, for example, by one of the general formulae (1) to (11):

$$(S-L/S)_n; \qquad (1)$$

$$(S-L/S)_n\text{-}S; \qquad (2)$$

$$L/S\text{-}(S-L/S)_n; \qquad (3)$$

$$X\text{-}[(S-L/S)_n]_m+1 \qquad (4)$$

$$X\text{-}[(L/S-S)_n]_m+1; \qquad (5)$$

$$X\text{-}[(S-L/S)_n\text{-}S]_m+1; \qquad (6)$$

$$X\text{-}[(L/S-S)_n\text{-}L/S]_m+1; \qquad (7)$$

$$Y\text{-}[(S-L/S)_n]_m+1; \qquad (8)$$

$$Y\text{-}[(L/S-S)_n]_m+1; \qquad (9)$$

$$Y\text{-}[(S-L/S)_n\text{-}S]_m+1; \qquad (10)$$

$$Y\text{-}[(L/S-S)_n\text{-}L/S]_m+1; \qquad (11)$$

where

S is a vinylaromatic block,

L/S is the soft phase comprising a block composed randomly of diene and vinylaromatic units, X is a radical of an n-functional initiator, Y is a radical of an m-functional coupling agent and m,n are natural numbers from 1 to 10.

A preferred block copolymer is one of the general formulae S-L/S-S, X-[-L/S-S]$_2$ and Y-[-L/S-S]$_2$ (meanings of the abbreviations as above) and a particularly preferred block copolymer is one whose soft phase is divided into blocks $$(L/S)_a\text{-}(L/S)_b; \qquad (12)$$

$$(L/S)_a\text{-}(L/S)_b\text{-}(L/S)_a; \qquad (13)$$

$$(L/S)_a\text{-}(L/S)_b\text{-}(L/S)_c; \qquad (14)$$

where a, b, c are different structures in the sense that the vinylaromatic/diene ratio in the individual blocks L/S differs or changes continuously within a block within the limits $(L/S)_a(L/S)_b$, the glass transition temperature $T_g$ of each part-block being below 25° C.

A block copolymer which has a plurality of blocks L/S and/or S having a different molar mass by molecule is also preferred.

Furthermore, a block S composed exclusively of vinylaromatic units may be replaced by a block L so that in general all that is important is that an elastomeric block copolymer is formed. Such copolymers may have, for example, one of the structures (15) to (18)

$$L\text{-}(L/S) \qquad (15)$$

$$(L/S)\text{-}L\text{-}(L/S) \qquad (16)$$

$$(L/S)_1\text{-}L\text{-}(L/S)_2 \qquad (17)$$

$$L\text{-}(L/S)_1\text{-}(L/S)_2. \qquad (18)$$

Preferred vinylaromatics are styrene, o-methylstyrene, vinyltoluene and mixtures of these compounds. Preferred dienes are butadiene, isoprene, piperylene, 1-phenylbutadiene and mixtures of these compounds. A particularly preferred monomer combination comprises butadiene and styrene.

The soft blocks are particularly preferably composed of from 25 to 75% by weight of styrene and from 25 to 75% by weight of butadiene. Soft blocks which have a butadiene content of from 34 to 69% by weight and a styrene content of from 31 to 66% by weight are particularly preferred.

In the case of the monomer combination styrene/butadiene, the amount of diene in the total block copolymer is from 15 to 65% by weight and that of the vinylaromatic component is accordingly from 85 to 35% by weight. Butadiene/styrene block copolymers having a monomer composition comprising from 25 to 60% by weight of diene and 75 to 40% by weight of vinylaromatic compound are particularly preferred.

The block copolymers are obtainable by anionic polymerization in a nonpolar solvent with the addition of a polar cosolvent. It is believed that the cosolvent acts as a Lewis base with respect to the metal cation. Preferably used solvents are aliphatic hydrocarbons, such as cyclohexane or methylcyclohexane. Preferably used Lewis bases are polar aprotic compounds, such as ethers and tertiary amines. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example from 0.5 to 5% by volume. Tetrahydrofuran in an amount of from 0.1 to 0.3% by volume is particularly preferred. Experience has shown that 0.2% by volume is sufficient in most cases.

The copolymerization parameters and the proportion 1,2- and 1,4-linkages of the diene units are determined by the dose and structure of the Lewis base. Suitable polymers contain, for example, from 15 to 40% of 1,2-linkages and from 85 to 60% of 1,4-linkages, the percentages being based on diene units.

The anionic polymerization is initiated by means of organometallic compounds. Compounds of the alkali metals, in particular of lithium, are preferred. Examples of initiators are methyl lithium, ethyl lithium, propyl lithium, n-butyl lithium, sec-butyl lithium and tert-butyl lithium. The organometallic compound is added as a solution in a chemically inert hydrocarbon. The dose depends on the desired molecular weight of the polymer but is as a rule from 0.002 to 5 mol %, based on the monomers.

The polymerization temperature may be from 0 to 130° C., preferably from 30 to 100° C.

The amount by volume of the soft phase in the solid is of decisive importance for the mechanical properties. Experience has shown that the amount of the solid phase composed of diene and vinylaromatic sequences is from 60 to 95, preferably from 70 to 90, particularly preferably from 80 to 90, % by volume. The blocks S formed from the vinylaromatic monomers form the hard phase, the amount of which is accordingly from 1 to 40, preferably from 10 to 30, particularly preferably from 10 to 20, % by volume.

The volume fraction of the two phases can be measured by means of high-contrast electron microscopy or solid-state NMR spectroscopy. The proportion of vinylaromatic blocks can be determined by precipitation and weighing of the osmium degradation of the polydiene fraction. The future phase ratio of a polymer can also be calculated from the amounts of monomers used if polymerization is allowed to go to completion every time.

The block copolymer is uniquely defined by the quotient of the volume fraction in percent of the soft phase formed from the L/S blocks and the fraction of diene units in the soft phase, which is from 25 to 70% by weight for the styrene/butadiene combination.

The glass transition temperature ($T_g$) is influenced by the random incorporation of the vinylaromatic compounds into the soft block of the block copolymer and the use of Lewis bases during the polymerization. The glass transition temperature of the total copolymer is preferably from −50° C. to +25° C., particularly preferably less than 0° C.

The molecular weight of the blocks S is preferably from 1000 to 200,000, in particular from 3000 to 80,000 [g/mol]. Within a molecule, S blocks may have different molar masses.

The molecular weight of the block L/S is usually from 2000 to 250,000, preferably from 5000 to 150,000 [g/mol].

As in the case of block S, block L/S, too, may have different molecular weights within a molecule.

The coupling center X is formed by reacting the living anionic chain ends with a coupling agent which is at least bifunctional. Examples of such compounds appear in U.S. Pat. Nos. 3,985,830; 3,280,084; 3,637,554 and 4,091,053. For example, epoxidized glycerides, such as epoxidized linseed oil or Soya bean oil, are preferably used, divinylbenzene is also suitable. Dichlorodialkylsilanes, dialdehydes, such as terephthalaldehyde, and esters, such as ethyl formate or benzoate, are particularly suitable for the dimerization.

Preferred polymer structures are S-L/S-, X-[-L/S-S]$_2$ and Y-[-L/S-S]$_2$, where the random block L/S in turn may be divided into blocks L1/S1-L2/S2-L3/S3- . . . The random block preferably consists of from 2 to 15, particularly preferably from 3 to 10, part-blocks. The division of the random block L/S into as many part-blocks Ln/Sn as possible has the decisive advantage that, even in the case of a composition gradient within a part-block Ln/Sn, as can be avoided only with difficulty in the anionic polymerization under practical conditions, the L/S block as a whole behaves like a virtually perfect random polymer. It is therefore possible to add less than the theoretical amount of Lewis base, which increases the proportion of 1,4-diene linkages, reduces the glass transition temperature $T_g$ and decreases the susceptibility of the polymer to crosslinking. A larger or a smaller proportion of part-blocks may be provided with a high diene content. As a result of this, the polymer retains a residual toughness and does not become completely brittle even below the glass transition temperature of the predominant L/S blocks.

All abovementioned weight and volume data are based on the monomer combination butadiene/styrene. However, these data may readily be converted to apply to other monomers technically equivalent to styrene and butadiene.

The block copolymers can be worked up by protonating the carbonions with an alcohol, such as isopropanol, acidifying the reaction mixture for example with a mixture of $CO_2$ and water, and removing the solvent. The block copolymers may contain oxidation inhibitors and antiblocking agents.

Mixtures of the above impact modifiers may also be used.

Sheet silicates having a content of nitrogen-containing compounds are used as component D), the antidrip agent. The amount of sheet silicates is from 0.3 to 20, particularly preferably from 0.5 to 10, % by weight, based on the total weight of the molding material. From 0.1 to 50, preferably from 0.1 to 20, in particular from 0.2 to 15, % by weight, based on the amount of sheet silicates, of nitrogen-containing compounds are added to said silicates. Suitable sheet silicates are natural and synthetic silicates in the untreated and acid-treated form. For example, the natural sodium silicates natronsilite, makatite, magadiite, kenyaite, kanemite, revolite and grumantite are suitable. Bleaching earths comprising clear-like sheet silicates, such as talc, mica, kaolinite and bentonite, are particularly suitable. The hydrated aluminum silicates and/or magnesium silicates which are among the bleaching earths are particularly preferred. These generally contain montmorillonite as an essential component. They include, for example, the bleaching earth "Catalyst K 10" from Süd-Chemie, Munich, which is a mineral compound modified with hydrochloric acid and based on calcium montmorillonite, and aluminum sheet silicate of the smectide group. Also suitable are the sheet silicates of the TONSIL® brand from Süd-Chemie, which are obtained from natural bentonites by treatment with acid. A description of suitable silicates appears in, for example, G. Lagaly, Progr. Colloid & Polym. Sci. 95, (1994), 61–72, and the publications mentioned there. Furthermore one or more nitrogen-containing compounds must be mixed with the sheet silicate or silicates. Owing to the increased acidity of the interlamellar water, the organic nitrogen bases are generally intercalated in the sheet structure. Oxamide (oxalic acid diamide), melamine (2,4,6-triamino-1,3,5-triazine) and melamine cyanurate have proven to be preferred nitrogen compounds. They may be mixed either individually or in combination with the sheet silicates. Additional oxamide is particularly preferred.

The antidrip agent is preferably obtained by incorporating the nitrogen-containing compounds into the sheet silicates by means of commercial mixing units. For example, ball mills have proven particularly suitable for this purpose. The preparation of the antidrip agent is advantageously carried out at room temperature. The mixing time is up to 3 hours.

The component E) is present in the novel molding materials in amounts of from 1 to 20, preferably from 2 to 15, % by weight. For example, organophosphorus compounds of general formulae I, II and III:

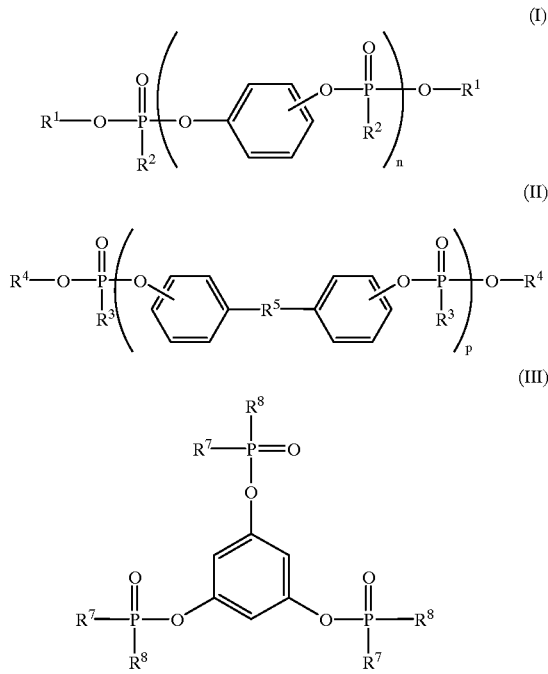

where
$R^1$ and $R^4$ independently of one another, are each unsubstituted or substituted alkyl, cycloalkyl or aryl, $R^2$, $R^3$, $R^7$ and $R^8$, independently of one another, are each unsubstituted or substituted alkyl, cycloalkyl, aryl, alkoxy or aryloxy, $R^5$ is alkylene, —$SO_2$—, —CO—, —N=N— or —($R^6$)P(O)—, $R^6$ is unsubstituted or substituted alkyl, cycloalkyl, aryl or alkylaryl and n and p, independently of one another, are each from 1 to 30, are suitable.

Suitable substituents in compounds of the formulae (I), (II) and (III) are cyano, hydroxyl, alkyl and halogen, such as F, Cl, Br or I.

Preferred alkyl radicals in compounds of the formulae (I), (II) and (III) are $C_1$–$C_{20}$-alkyl, in particular $C_1$–$C_{12}$-alkyl, such as methyl, ethyl, n-propyl, n-butyl, neopentyl, n-hexyl, n-octyl, n-nonyl, n-dodecyl, 2-ethylhexyl, 3,5,5-trimethylhexyl and cyanoethyl.

Preferred aryl radicals in compounds of the formulae (I), (II) and (III) are phenyl and naphthyl as well as monosubstituted or polysubstituted radicals such as tolyl, xylyl, mesityl and cresyl.

Preferred alkylaryl radicals in compounds of the formulae (I), (II) and (III) are $C_1$–$C_{20}$-alkylaryl, in particular $C_1$–$C_{12}$-alkylaryl, the alkyl moiety and aryl moiety being defined as above.

Preferred cycloalkyl groups in compounds of the formulae (I), (II) and (III) include $C_3$–$C_{10}$-cycloalkyl, such as cyclobutyl, cyclopentyl, cyclohexyl and cycloheptyl.

Preferred alkoxy radicals in compounds of the formulae (I), (II) and (III) are $C_1$–$C_{20}$-alkoxy, the $C_1$–$C_{20}$-alkyl moiety being defined as above.

Preferred aryloxy radicals in compounds of the formulae (I), (II) and (III) include those in which the aryl moiety is defined as above.

Preferred alkylene radicals in compounds of the formulae (I), (II) and (III) are $C_1$–$C_6$-alkylene, such as methylene, ethylene, propylene and hexylene.

It should be noted that the industrially available products may be mixtures of different oligomers or isomers.

The preparation of phosphoric esters is described in Houben-Weyl, "Methoden der organischen Chemie" Vol. XII/2, Thieme Verlag 1972. The compounds E) are preferably obtained by transesterification under basic catalysis or by reaction of phosphoryl chloride with phenols under magnesium chloride or aluminum chloride catalysis.

Preferred products of the formula (I) are hydroquinone diphenyl diphosphate or resorcinol diphenyl diphosphate. Preferred products of the formula (II) are obtained by reacting bisphenol A or S with triphenyl phosphate under basic catalysis.

The novel molding materials may also contain, as component E), the following compounds individually or as a mixture:

(1) Phosphine oxides of the general formula (IV)

where $R^a$, $R^b$ and $R^c$ are identical or different and are selected from a hydrogen atom and straight-chain and branched, unsubstituted and substituted alkyl, aryl, alkylaryl and cycloalkyl groups of up to 40 carbon atoms.

Preferred alkyl radicals here are $C_1$–$C_{20}$-alkyl, in particular $C_1$–$C_{12}$-alkyl, such as methyl, ethyl, n-propyl, n-butyl, neopentyl, n-hexyl, n-octyl, n-nonyl, n-dodecyl, 2-ethylhexyl, 3,5,5-trimethylhexyl and substituted alkyl, such as cyanoethyl.

Preferred aryl radicals are phenyl and naphthyl as well as monosubstituted and polysubstituted radicals such as tolyl, xylyl, mesityl and cresyl.

Preferred alkylaryl radicals are $C_1$–$C_{20}$-alkylaryl, in particular $C_1$–$C_{12}$-alkylaryl, the alkyl moiety and aryl moiety being defined as above.

Preferred cycloalkyl groups include $C_3$–$C_{10}$-cycloalkyl, such as cyclobutyl, cyclopentyl, cyclohexyl and cycloheptyl.

Suitable substituents are cyano, hydroxyl, $C_{1-4}$-alkyl and halogen, such as F, Cl, Br and I.

(2) Phosphates of the general formula (V)

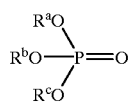

(V)

where $R^a$, $R^b$ and $R^c$ are identical or different and have the abovementioned meanings.

Examples of phosphine oxides of the formula IV are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl) phosphine oxide, benzylbis(cyclohexyl)phosphine oxide, benzylbisphenylphosphine oxide and phenylbis(n-hexyl) phosphine oxide. Triphenylphosphine oxide, tricyclohexylphosphine oxide, tris(n-octyl)phosphine oxide and tris(cyanoethyl)phosphine oxide are particularly preferably used.

Particularly suitable phosphates of the formula V are alkyl- and aryl-substituted phosphates. Examples are phenyl bisdodecyl phosphate, phenyl bisneopentyl phosphate, phenyl ethyl hydrogen phosphate, phenyl bis(3,5,5-trimethylhexyl)phosphate, ethyl diphenyl phosphate, bis(2-ethylhexyl)p-tolyl phosphate, tritolyl phosphate, trixylyl phosphate, trimesityl phosphate, bis(2-ethylhexyl)phenyl phosphate, tris(nonylphenyl)phosphate, bis(dodecyl)p-tolyl phosphate, tricresyl phosphate, triphenyl phosphate, dibutyl phenyl phosphate, p-tolyl bis(2,5,5-trimethylhexyl) phosphate and 2-ethylhexyl diphenyl phosphate. Phosphorus compounds in which each R is aryl are particularly preferred. Triphenyl phosphate, trixylyl phosphate and trimesityl phosphate are very particularly suitable. Furthermore, cyclic phosphates may be used. Diphenyl pentaerythrityl diphosphate is particularly suitable.

Mixtures of the following phosphine oxides and phosphates are particularly preferred: triphenylphosphine oxide/triphenyl phosphate or trixylyl phosphate, tricyclohexylphosphine oxide and triphenyl phosphate, tris(cyanoethyl) phosphine oxide and triphenyl phosphate and tris(n-octyl) phosphine oxide and triphenyl phosphate. Mixtures of a plurality of phosphine oxides and phosphates may also be used, for example the mixture comprising triphenylphosphine oxide, triphenyl phosphate and trixylyl phosphate.

Furthermore, mixtures of the higher phosphates and monophosphates and/or monophosphine oxides in any ratio may be used.

Suitable additives F) are heat stabilizers and light stabilizers, lubricants and mold release agents, colorants, such as dyes and pigments, in conventional amounts. Further additives are reinforcing agents, such as glass fibers, asbestos fibers, carbon fibers, aromatic polyamide fibers and/or fillers, such as gypsum fibers, synthetic calcium silicates, kaolin, calcium-containing kaolin, wollastonite, talc and chalk. Low molecular weight or high molecular weight polymers are also suitable additives, polyethylene wax being particularly preferred as lubricant. The amount of these additives is generally not more than 60, preferably not more than 50, in particular not more than 30, % by weight, based on the total weight of the components.

The preparation of the novel molding materials is advantageously carried out by mixing the components at from 250 to 300° C. in a conventional mixing apparatus, such as a kneader, a Banbury mixer or a single-screw extruder, preferably a twin-screw extruder. Thorough mixing is necessary in order to obtain a very homogeneous molding material. The order in which the components are mixed may be varied; two or, if required, more components may be premixed or all components may be mixed together.

The novel molding materials can be converted, for example by injection molding or extrusion, into moldings which are flame-retardant, do not tend to drip flaming particles in the fire test according to UL 94 and also have good natural color even after storage at elevated temperatures.

The novel molding materials are very suitable for the production of shaped articles of all types, for example by injection molding or extrusion. They may furthermore be used for the production of films and semifinished products by the thermoforming or blow molding method.

The novel thermoplastic molding materials permit VO classification in the test according to UL 94. Dripping of flaming particles occurs only to a very limited extent, if at all. Extended combustion times likewise do not occur. Moreover, the advantageous Theological and mechanical properties, described at the outset, of molding materials containing polyphenyl ethers and vinylaromatic polymers are not lost as a result of the addition of sheet silicates which contain nitrogen-containing compounds. Since the described addition of sheet silicates does not lead to discoloration of the polymer material, pale colorings can also be achieved. These have good color stability. Accordingly, the thermoplastic molding materials described have a considerable range of use.

EXAMPLES

The following components were used:

Component A)

Poly-2,6-dimethyl-1,4-phenylene ether having an average molecular weight ($M_w$) of 40,000 g/mol.

Component $B_1$)

High impact polystyrene containing 9% by weight of polybutadiene and having cellular particle morphology and a mean particle size of the soft component of 1.9 μm. The viscosity number of the Hart matrix is 80 ml/g (0.5% strength by weight in toluene at 23° C.).

Component $B_2$)

High impact polystyrene containing 11% by weight of polybutadiene and having cellular particle morphology and a mean particle size of the soft component of 3.5 μm. The viscosity number of the Hart matrix is 80 ml/g (0.5% strength by weight in toluene at 23° C.).

Component C)

An ethylene/butylene/styrene block copolymer containing 29% by weight of polystyrene (Kraton® G 1650 from Shell).

Component D)

D1: Bleaching earth Catalyst K 10 containing 2% by weight of oxamide,

D2: Bleaching earth Catalyst K 10 containing 2% by weight of melamine,

D3: Bleaching earth Catalyst K 10 containing 2% by weight of melamine cyanurate.

The components D1 to D3 were obtained by reacting Catalyst K 10 (from Süd-Chemie) with, in each case, 2% by weight of oxamide, melamine or melamine cyanurate in a ball mill at 25° C. for 3 hours.

Component E)

Triphenyl phosphate, Disflamoll® TP (Bayer AG), Resorcinol diphosphate, Fyrolflex® RDP (Akzo).

Preparation of the thermoplastic molding materials

The components A) to E) were mixed in a twin-screw extruder (ZSK 30 from Werner & Pfleiderer) at 280° C., the mixture was extruded and the extrudate was cooled and granulated. The dried granules were processed at 260° C. to give circular disks and flat bars for the UL 94 test.

The damaging energy $W_S$ was determined according to DIN 53443 at 23° C.

The heat distortion resistance of the samples was determined by means of the Vicat softening temperature, determined according to DIN 53460, using a force of 49.05 N and a temperature increase of 50 K/h, for standard small bars.

The color stability was visually assessed (light: 1, dark: 5) for circular disks after storage at elevated temperatures (14 days, 90° C.).

The composition of the molding materials and the results of the tests are shown in the table below.

F) from 0 to 60% by weight of further additives.

2. A flame-retardant thermoplastic molding composition as claimed in claim 1, which contains Component A) in an amount of from 15 to 87% by weight,
Component B) in an amount of from 10 to 82% by weight,
Component C) in an amount of from 0.5 to 30% by weight,
Component D) in an amount of from 0.5 to 10% by weight,
Component E) in an amount of from 2 to 15% by weight and
Component F) in an amount of from 0 to 50% by weight.

3. A flame-retardant thermoplastic molding composition as claimed in claim 1, wherein a poly(2,6-dialkyl-1,4-phenylene ether) is used as component A).

4. A flame-retardant thermoplastic molding composition as claimed in claim 1, wherein the polyphenylene ether A) has an average molecular weight ($M_w$) of from 25,000 to 50,000 g/mol.

5. A flame-retardant thermoplastic molding composition as claimed in of claim 1, wherein high impact polystyrene containing from 8 to 17% by weight of polybutadiene is used as component B).

6. A flame-retardant thermoplastic molding composition as claimed in claim 1, wherein the amount of the one nitrogen-containing compounds is from 0.1 to 20% by weight, based on the component D).

7. A molding, fiber or film obtainable from a flame-retardant thermoplastic molding composition as claimed in claim 1 as the essential component.

TABLE 1

| Molding material No. | V1[*) | 1 | 2 | 3 | 4 | 5 | 6 | V2[*) | V3[*) |
|---|---|---|---|---|---|---|---|---|---|
| Component [% by weight] | | | | | | | | | |
| A | 40 | 39.1 | 38.3 | 39.1 | 39.1 | 39.1 | 39.1 | 39.1 | 39.9 |
| B1 | 47 | 46.0 | 44.8 | 46 | 46.0 | 46.0 | 43.7 | 46 | 46.9 |
| B2 | — | — | — | — | — | — | 2,3 | — | — |
| $C_1$ | 3 | 2.9 | 2.9 | 2.9 | 2.9 | 2.9 | 2.9 | 2.9 | 3 |
| $D_1$ | — | 2 | 2 | — | — | — | 2 | — | — |
| $D_2$ | — | — | — | 2 | — | — | — | — | — |
| $D_3$ | — | — | — | — | 2 | 2 | — | — | — |
| Bleaching earth | — | — | — | — | — | — | — | 2 | — |
| Oxamide | — | — | — | — | — | — | — | — | 0.2 |
| $E_1$ | 10 | 10 | 12 | 10 | 10 | — | 10 | 10 | 10 |
| $E_2$ | — | — | — | — | — | 10 | — | — | — |
| $W_s$ [Nm] | 34 | 31 | 32 | 29 | 27 | 28 | 35 | 33 | 34 |
| Vicat B [° C.] | 111 | 112 | 107 | 111 | 112 | 115 | 111 | 111 | 111 |
| UL 94 | V-2 | V-1 | V-0 | V-1 | V-1 | V-1 | V-1 | V-2 | V-2 |
| (Bars dripped) | (5) | (0) | (0) | (0) | (0) | (0) | (0) | (5) | (5) |
| Combustion time[s] | 78 | 64 | 32 | 72 | 75 | 84 | 76 | 98 | 85 |
| Color of the circular disks after storage | 3 | 2 | 2 | 2 | 2 | 2 | 2 | 2 | 3 |

[*)V: Comparative experiments

We claim:

1. A flame-retardant thermoplastic molding composition containing
   A) from 5 to 97.7% by weight of a polyphenylene ether,
   B) from 1 to 93.7% by weight of vinylaromatic polymers,
   C) from 0 to 50% by weight of impact modifiers,
   D) from 0.3 to 20% by weight of sheet silicates which contain one or more nitrogen-containing compounds in amounts of from 0.1 to 50% by weight, based on the sheet silicates, wherein the one or more nitrogen-containing compounds are oxamide, melamine, melamine cyanurate or a mixture of two or more of these compounds,
   E) from 1 to 20% by weight of a flameproofing agent and 8. The composition of claim 1 wherein the nitrogen containing is oxamide.

9. The composition of claim 1 wherein the nitrogen containing is melamine.

10. The composition of claim 1 wherein the nitrogen containing is melamine cyanurate.

11. The composition of claim 1 wherein the sheet silicates are hydrated aluminum silicates, aluminum/magnesium silicates or magnesium silicates.

12. The composition of claim 1 wherein the sheet silicates are talc, mica, kaolinite or bentonite or mixtures thereof.

* * * * *

UNITED STATES PATENT AND TRADEMARK OFFICE
CERTIFICATE OF CORRECTION

| | |
|---|---|
| PATENT NO. | : 6,172,148 B1 |
| DATED | : January 9, 2001 |
| INVENTOR(S) | : Weber et al. |

It is certified that error appears in the above-identified patent and that said Letters Patent is hereby corrected as shown below:

<u>Column 14, claim 5,</u>
Line 23, after "of the one" insert -- or more --.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*